United States Patent [19]

McLoughlin et al.

[11] 3,843,088
[45] Oct. 22, 1974

[54] MOULDING APPARATUS

[75] Inventors: Noel Peter McLoughlin; James Livingstone Taylor, both of Victoria, Australia

[73] Assignees: Tupperware of Australia Pty. Ltd.; Knox Schlapp Pty. Ltd., both of Victoria, Australia

[22] Filed: Feb. 1, 1973

[21] Appl. No.: 328,819

[30] Foreign Application Priority Data
Feb. 1, 1972 Australia.............................. 7811/72

[52] U.S. Cl.................... 249/144, 249/58, 249/180, 249/184, 249/186, 425/443, 425/DIG. 5, 425/DIG. 58, 425/249
[51] Int. Cl. ... B29c 7/00, B29c 17/00, B29d 23/02, B29f 1/14
[58] Field of Search........ 425/DIG. 58, 443, DIG. 5; 249/59, 180, 184, 186, 144

[56] References Cited
UNITED STATES PATENTS
| | | | |
|---|---|---|---|
| 3,339,242 | 9/1967 | Lamb........................... | 425/DIG. 58 |
| 3,373,460 | 3/1968 | Ladney........................ | 425/DIG. 5 |
| 3,387,323 | 6/1968 | Wyllie et al.................. | 425/DIG. 5 |
| 3,596,318 | 8/1971 | Kyritsis et al................. | 425/DIG. 5 |

FOREIGN PATENTS OR APPLICATIONS
1,344,185 10/1963 France........................... 425/DIG. 5

*Primary Examiner*—J. Howard Flint, Jr.
*Attorney, Agent, or Firm*—Ladas, Parry, Von Gehr, Goldsmith & Deschamps

[57] ABSTRACT

This invention relates to a moulding apparatus including outer moulding means and an expandable and collapsible core located within said outer moulding means, said core being expandable to provide a moulding gap between said core and said outer moulding means in which an article to be produced may be moulded and collapsible to facilitate removal of the moulded article therefrom, said core being comprised of at least three separate core members combining when said core is in its expanded position to provide an outer moulding surface, at least one of said core members being a transversely slidable core member movable inwardly substantially perpendicularly with the core axis and at least two of two core members being substantially longitudinally slidable core members slidable in a generally longitudinal direction at an angle to the actual longitudinal axis of the moulding core so that on sliding from an expanded moulding position to a retracted position the surface portions of the moulding surface provided by each of the longitudinal members also moves inwardly of the moulding core.

3 Claims, 4 Drawing Figures

MOULDING APPARATUS

This invention relates to apparatus used in the moulding of pipes, pipe couplings, expansion joints and other hollow articles in which it is necessary to provide a core for the moulding operation.

In the injection moulding of hollow plastic articles an outer mould and a mould core are provided. The plastic material is injected for moulding into the gap between the outer mould and the mould core. Difficulties are experienced however in providing an undercut portion on the inside surfaces of the articles. For example only, in the case of an expansion joint or pipes it is desirable to have moulded into an inside wall of the cylindrical joint, a seat for an O-ring seal.

Insurmountable difficulties have been met with attempts to provide such an undercut portion on the internal surface of a hollow article since it is necessary to provide some form of projection on the core and then it is difficult to remove the article from the core subsequent to moulding.

The object of the present invention is to provide apparatus by means of which it is possible to provide undercut portions on the internal surfaces of moulded articles and still be able to remove the article from the core without undue difficulty.

The present invention provides moulding apparatus including an outer moulding means expandable away from the article moulded, said outer moulding means being comprised by a plurality of transversely slidable outer moulding members supported on a mould base and an expandable and collapsible core located within said outer moulding means, said core being expandable to provide a moulding gap between said core and said outer moulding means in which an article to be produced may be moulded and collapsible to facilitate removal of the moulded article therefrom, said core being comprised of at least three separate core members combining when said core is in its expanded position to provide an outer moulding surface, at least one of said core members being a transversely slidable core member movable inwardly perpendicularly with the core axis and at least two of two core members being longitudinally slidable core members slidable in a generally longitudinal direction at an angle to the actual longitudinal axis of the moulding core so that on sliding from an expanded moulding position to a retracted position the surface portions of the moulding surface provided by each of the longitudinal members also moves inwardly of the moulding core and wherein each of said core members is provided with cooling means within its structure. may be moulded and collapsible to facilitate removal of the moulded article therefrom, said core being comprised of at least three separate core members combining when said core is in its expanded position to provide an outer moulding surface, at least one of said core members being a transversely slidable core member movable inwardly substantially perpendicularly with the core axis and at least two of two core members being substantially longitudinally slidable core members slidable in a generally longitudinal direction at an angle to the actual longitudinal axis of the moulding core so that on sliding from an expanded moulding position to a retracted position the surface portions of the moulding surface provided by each of the longitudinal members also moves inwardly of the moulding core.

The following description refers in more detail to these essential features and further optional features of the invention. To facilitate understanding of the invention, reference is made to the accompanying drawings where these features are illustrated in preferred form. It is to be understood however, that the essential and optional features of the invention are not limited to the specific forms of these features as shown in the drawings.

Figure 2:
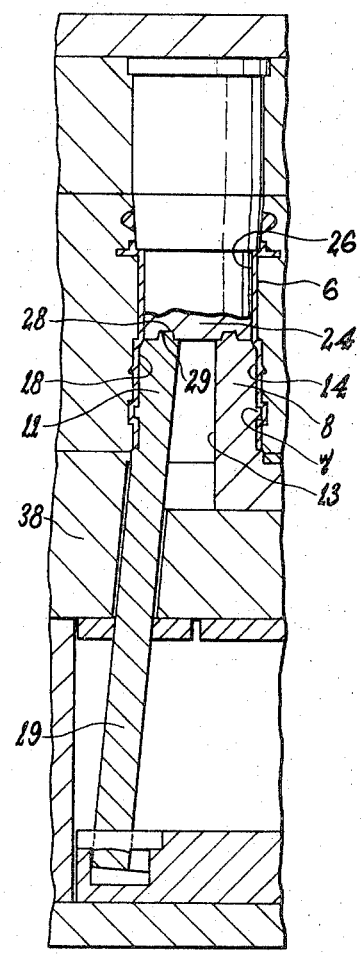
FIG. 2 is a similar view with the core in its expanded moulding position.

Thus the present invention provides moulding apparatus that includes outer moulding means and a collapsible moulding core located within the outer moulding means to provide a moulding gap 6 (FIG. 2) therebetween in which the article to be produced may be moulded. The collapsible moulding core includes an outer peripheral moulding surface which may be provided with one or more undercutting portions, such as provided by a protruding ridge 7 to form an undercut portion in the interior of the moulded article. This collapsible moulding core includes at least three separate core members each providing a part of the moulding surface. Preferably the core members are arranged side by side in substantial parallel with the longitudinal axis of the moulding core to divide the moulding surface generally longitudinally into at least three surface portions and each of these may provide a part of the protruding ridge 7 or ridges.

At least one of the core members is a transversely slidable core member 8 (hereinafter referred to as a transverse member). The transverse member or members are movable inwardly of the collapsible moulding core at substantially right angles with the core axis 9 to retract the transverse member or members from an expanded moulding position (FIG. 2, 4) to a retracted position (FIG. 1, 3), separated by a distance at least equal to the depth of the undercut portion, so that, in the retracted position, the transverse member or members does not inhibit the removal of the moulded article from the core (as illustrated best in FIG. 1).

At least two of the core members are longitudinally slidable core members 11 (hereinafter referred to as longitudinal members). The longitudinal members are slidable in a general longitudinal direction but at an angle to the actual longitudinal axis of the moulding core so that, on sliding from a moulding to a retracted position, the surface portions of the moulding surface provided by each of the longitudinal members also moves inwardly of the moulding core by a distance at least equal to the depth of the undercut portions so as not to inhibit the removal of the moulded article from the moulding core.

Preferably three transverse members 8 are provided substantially equidistant around the surface of the moulding core and separated by an equal number of longitudinal members 11 so that in all there are preferably six separate core members providing the collapsible moulding core.

Figure 3:
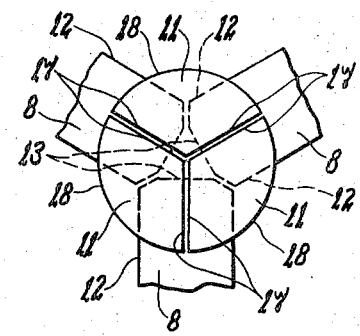
FIG. 3 is an illustrative plan of the core members in collapsed position.
Figure 4:
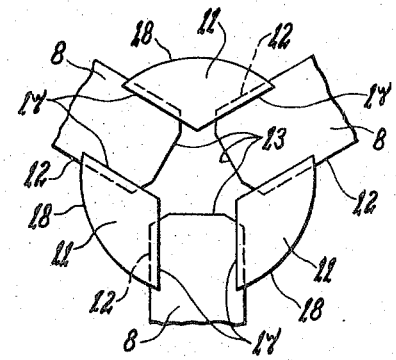
FIG. 4 is an illustrative plan of the core members in expanded position.

Preferably the transverse members are each comprised by a pair of side walls 12, an inner wall 13 and an outer moulding wall 14. Preferably the outer moulding wall 14 is of generally convex formation and is of complimentary shape to the desired inside shape for the article to be moulded. Thus the moulding wall preferably includes a portion of a ridge 7 or ridges to provide undercut portions in the internal surface of the article to be moulded. Preferably in longitudinal cross-section as shown in FIGS. 3 and 4, the side walls 12 of the transverse member 8 are substantially parallel to each other and with a radial line from the centre of the moulding core. Preferably the side walls are approximately equally spaced from that radial line and provide a sliding guide for the transverse member 8 so that it is able to slide towards and away from the centre of the core radially. In longitudinal cross-section, the side walls of the transverse member are preferably tapered towards the article outlet end of the moulding apparatus to provide a sliding guide for the longitudinal members 11 to enable them to move inwardly as they slide in the substantially longitudinal direction as will be more fully explained below. Thus the transverse members will have a narrow end towards the outlet of the moulding apparatus and a wide end remote therefrom.

Preferably each transverse member 8 includes a control leg 16 preferably provided at its widest end for controlling the sliding movement of the transverse member. Preferably the control leg 16 extends radially beyond the moulding core, to provide access for means to move the transverse members.

Preferably cooling means (not shown) are provided in association with each of the transverse members. The cooling means may include a bore hole through the transverse member 8 and control leg 16 for the passage of cooling fluid such as cooling water internally of the transverse member and control leg.

Preferably the longitudinal members include a pair of inner walls 17 and an arcuate moulding wall 18 which is of generally complimentary shape to the desired internal shape of the article to be moulded, so that it is upon the arcuate moulding wall 18 that the undercutting ridges 7 are provided as desired. Preferably the side walls intersect each other before the centre of the moulding core so that the angle of intersection is greater than 60°. The side walls 17 of the longitudinal members are adapted to abut against the side walls 12 of the transverse members as before outlined so that the transverse members are able to slide transversely in the core in contact with those side walls, but as the transverse walls are tapered in the longitudinal direction, the longituduinal members are able to slide therealong in a substantially longitudinal direction but at the same time to move inwardly to allow the undercutting portions to clear the internal surface of the moulded article. As a result it is preferred that the side walls 17 of the longitudinal member are at the same angle of taper as are the side walls 12 of the transverse members having a thick portion at the article outlet end of the moulding apparatus and a thin portion at the end remote therefrom.

Preferably the longitudinal members each include a tail portion 19 of similar shape as the body and attached at the thin end thereof to provide for control of the movement of the longitudinal members. Preferably the longitudinal members include cooling means (not shown) such as provided by an axial bore therethrough for the passage of cooling fluids such as cooling water.

Thus it will be seen that the transverse members 8 and the longitudinal members 11 may be arranged to provide a complete moulding surface complimentary to and conforming with the internal surface of the article 5 to be moulded and that the transverse members 8 may be moved inwardly so that they clear the undercut portions on the internal surface of the article to be moulded. The longitudinal members 11 are then able to slide along the transverse members to move towards the outlet of the moulding apparatus but also to move inwardly so that they too clear the undercut portions of the article to be moulded, which may then be removed readily from the moulding core.

Preferably the transverse members and longitudinal members provide a single annular moulding ridge 7 around the moulding core to provide on the internal surface of the article to be moulded a receiving recess 21 for an O-ring seal or the like and in this manner the moulding apparatus is particularly suitable for forming an expansion coupling for moulded pipes, as will be further discussed more fully hereinafter.

The transverse and longitudinal members preferably also provide a moulding shoulder 22 preferably adjacent the control leg of the transverse members. The moulding shoulder 22 is preferably annular and located at the wide end of the transverse member and narrow end of the longitudinal members to provide an end mould for the article to be cast and a locating surface 23 to abut against the outer moulding means to space the transverse members and longitudinal members from the outer moulding means to provide the desired moulding gap 6 therebetween.

The transverse members and longitudinal members of the invention may be comprised in a lower part of the collapsible moulding core and a second upper core part may also be provided. Preferably the upper core part is provided by an upper core member 24 that is longitudinally slidable with respect to the collapsible moulding core axis. The upper core member 24 preferably includes a substantially continuous side wall 26 that conforms to the desired internal shape of the upper portion of the article to be moulded and a lower end wall 27 that preferably abuts against the longitudinal members 11 and the transverse members 8 that comprise the lower core part. Preferably the upper core member 24 is substantially hollow and cooling means are provided therein (not shown). Preferably the cooling means includes a cooling insert that is hollow to provide a cooling passageway within the upper core member and is substantially fluted adjacent the internal surface of the upper core member to direct coolant fluid thereover, such as coolant water.

Preferably positioning means are provided to interlock the upper core member and the lower core part. To this end the end wall 27 of the upper core member is preferably provided with an annular groove 28 to receive an annular ridge 29 provided around the upper most portion of the lower core part. Thus it is preferred that each of the transverse and longitudinal core members provides a portion of the annular ridge 29 that is interlocked within the annular groove 28 on the upper core member. Thus the upper core member may be coupled with the longitudinal and transverse members to provide the collapsible moulding core.

To remove the article therefrom the upper core member 24 is first raised away from the longitudinal and transverse members, the transverse members 8 are then retracted transversely within the core, and the longitudinal members 11 are then slid upwardly and inwardly so that the article may be raised therefrom.

Activating means (not shown) are provided to move the upper core member and longitudinal and transverse members in the manner outlined above. Preferably separate activating means are provided for each of the members to operate independantly in the desired sequence. The activating means preferably include a transverse member activating means. Preferably the transverse member activating means is provided by a hydraulic ram for each of the transverse members and located at the end of each of the control legs. Whilst hydraulic rams are most suitable for this purpose it will be appreciated that any other mechanism by which the control legs may be activated can be used as desired.

The activating means also includes longitudinal member activating means. Preferably a common activating means is provided for the various longitudinal members provided. To this end a longitudinal member supporting plate 31 may be provided into which the tail portions 19 of the longitudinal members are fitted. A hydraulic ram or other suitable activating device may be provided to move the supporting plate 31 and thus the longitudinal member 11 in the manner outlined above.

Preferably the activating means also includes lifting means (not shown) for the upper core member. The lifting means may be comprised by a lifting hydraulic ram or other suitable apparatus as will be appreciated by those skilled in this particular art.

The outer moulding means may be comprised by any suitable apparatus. Preferably the outer moulding means includes a plurality of transversely slidable outer moulding members 32. Any suitable number of transversely slidable outer moulding members may be provided as desired. Preferably however three such members are provided and are movable into a moulding position to provide an outer moulding surface for the article to be cast. Thus the inside walls 33 of the transversely slidable outer moulding members are of complimentary shape to the desired outside shape of the article to be moulded. The members are slidable in a radial direction with respect to the axis of the moulding core to a retracted position (FIG. 1) whereby the articles moulded 5 may be readily removed therefrom. Preferably the outside walls 34 of the transversely slidable outer moulding members are tapered walls so that the members 32 have a narrow end towards the outlet end of the moulding apparatus and a wider end remote therefrom on which the members are slidable. Any suitable means may be used to slidably mount the members and to activate movement thereof. Preferably hydraulic rams are provided for this purpose.

Figure 1:
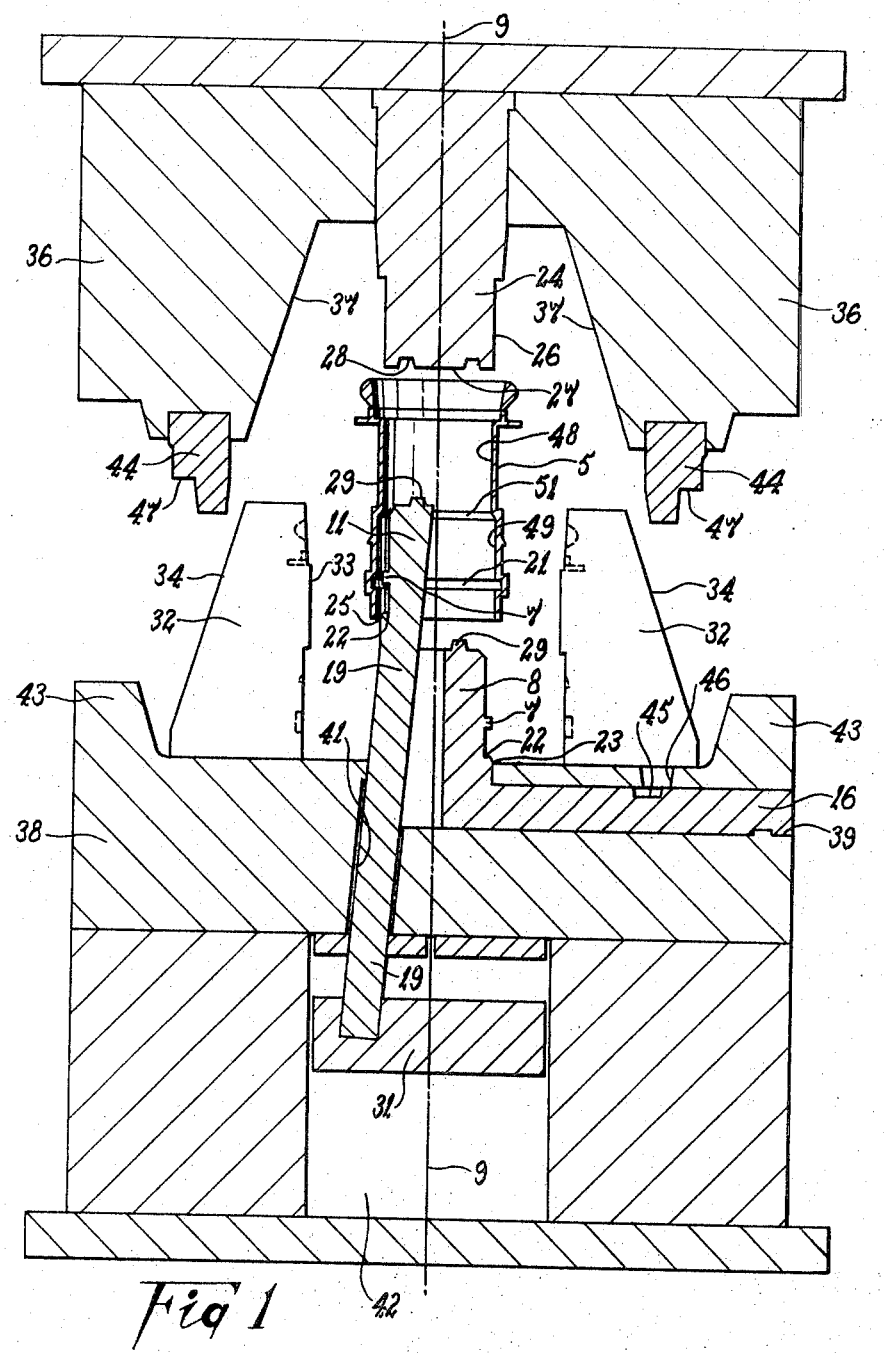
FIG. 1 is a cross-sectional view of a suitable form of apparatus showing the core in its collapsed position whereby the article moulded is removed easily.

Preferably the outer moulding means includes a skirt member 36. Preferably the skirt member provides an annular flange portion that extends over the outer moulding members 32 to hold them rigidly in the moulding position (FIG. 2), but when the skirt member is removed therefrom allows the outer moulding members to move into a retracted position (FIG. 1). Preferably the inner surface 37 of the annular flange is inclined to conform to the inclined outer wall 34 of the outer moulding members so that as the skirt member is moved down it provides a wedging action that tends to move the outer moulding members into their moulding position. Preferably the skirt member is also used to support at its centre the upper core member 24 previously outlined so that the skirt member is operated by the activating means previously discussed to move simultaneously the upper core member and to move the annular flange.

Preferably a mould base 38 is provided to support the transversely slidable outer moulding members 32 which are slidable thereon. Preferably the mould base includes transverse member receiving slots 39 substantially parallel to the top wall on which the transversely slidable outer moulding members are slidably mounted. Preferably the transverse member receiving slots 39 are adapted to receive the control legs 16 of the transverse members 8 that comprise portion of the collapsible moulding core. Preferably substantially vertical longitudinal member receiving slots 41 are provided in the mould base to receive the tail portions 19 of the longitudinal members that may be slid therethrough. Preferably the activating means for movement of the longitudinal members are provided in a recess 42 within the mould base with which the substantially vertical longitudinal member receiving slots 41 communicate. Preferably the mould base 38 also includes an upwardly extending substantially annular edge portion 43 to provide a lip to retain the outer moulding members 32 and on which the skirt member 36 above referred to may rest to provide a substantially closed housing for the moulding apparatus.

Preferably stop means are provided in association with the skirt member. Preferably the stop means is provided by an annular stop member 44 attached to the skirt member 36 and adapted to engage in a stop receiving recess 45 in the control leg 16 of the transverse members 8 when the various parts are in their moulding position. Thus there is preferably a stop hole 46 in the mould base 38 between the upper surface thereof and the transverse member receiving slot 39 through which the stop member 44 may pass to engage in the stop receiving recess 45 in the control leg of the transverse members. Preferably the stop member 44 includes a stepped portion 47 that rests on the top of the mould base when the parts are in their moulding position. Thus it will be seen that the stop menas provides for locking of the various parts during the moulding operation.

It will be seen from the above description that apparatus including the concept of the present invention may be employed for the moulding of many various types of hollow articles. In particular however the apparatus is found most suitable for the injection moulding of plastic expansion couplings for pipelines. As previously outlined, great difficulties have been experienced in providing undercut portions for such couplings but in accordance with the invention this may be readily facilitated.

A suitable expansion coupling that may be readily manufactured by using the apparatus of the present invention includes a substantially central section 48 of reduced circular internal cross-section. To provide this section the upper core member has a substantially cylindrical portion 26. The preferred coupling also has an end portion 49 of slightly increased internal diameter including an annular undercut slot 21 in which an O- ring seal may be provided. To provide this section of the coupling the transverse members and longitudinal members are provided with a substantially outer moulding surface that in combination is substantially cylindrical and includes an annular moulding ridge 7 as previously outlined. The upper edges of the transverse and longitudinal members are bevelled to provide a graded sloping step 51 between the outer section and the central section of the coupling. The opposite end of the coupling preferably includes an expanded portion for coupling purposes and this may be readily provided by the outer shape of the upper core member in conjunction with the outer moulding members.

It is to be understood that various minor alterations and/or modifications may be introduced into the foregoing description and arrangement of parts without departing from the ambit of the invention as defined in the claims annexed hereto.

Having now described our invention, what we claim as new and desire to secure by Letters Patent is:

1. Moulding apparatus including an outer moulding means expandable away from the article moulded, said outer moulding means being comprised by a plurality of transversely slidable outer moulding members supported on a mould base and an expandable and collapsible core located within said outer moulding means, said core being expandable to provide a moulding gap between said core and said outer moulding means in which an article to be produced may be moulded and collapsible to facilitate removal of the moulded article therefrom, said core being comprised of at least three separate core members combining when said core is in its expanded position to provide an outer moulding surface, at least one of said core members being a transversely slidable core member movable inwardly perpendicularly with the core axis and at least two of two core members being longitudinally slidable core members slidable in a generally longitudinal direction at an angle to the actual longitudinal axis of the moulding core so that on sliding from an expanded moulding position to a retracted position the surface portions of the moulding surface provided by each of the longitudinal members also moves inwardly of the moulding core and wherein each of said core members is provided with cooling means within its structure.

2. Moulding apparatus as claimed in claim 1 wherein the outer surface of said outer moulding members is sloped and adapted to correspond with a sloped skirt member movable in conjunction with an upper core member whereby said sloped skirt member may force said outer moulding members into their moulding positions.

3. Moulding apparatus as claimed in claim 2 wherein said sloped skirt member includes a stop member adapted to engage in a stop hole in said mould base whereby to lock the outer moulding members in their moulding positions.

* * * * *